No. 752,897. Patented February 23, 1904.

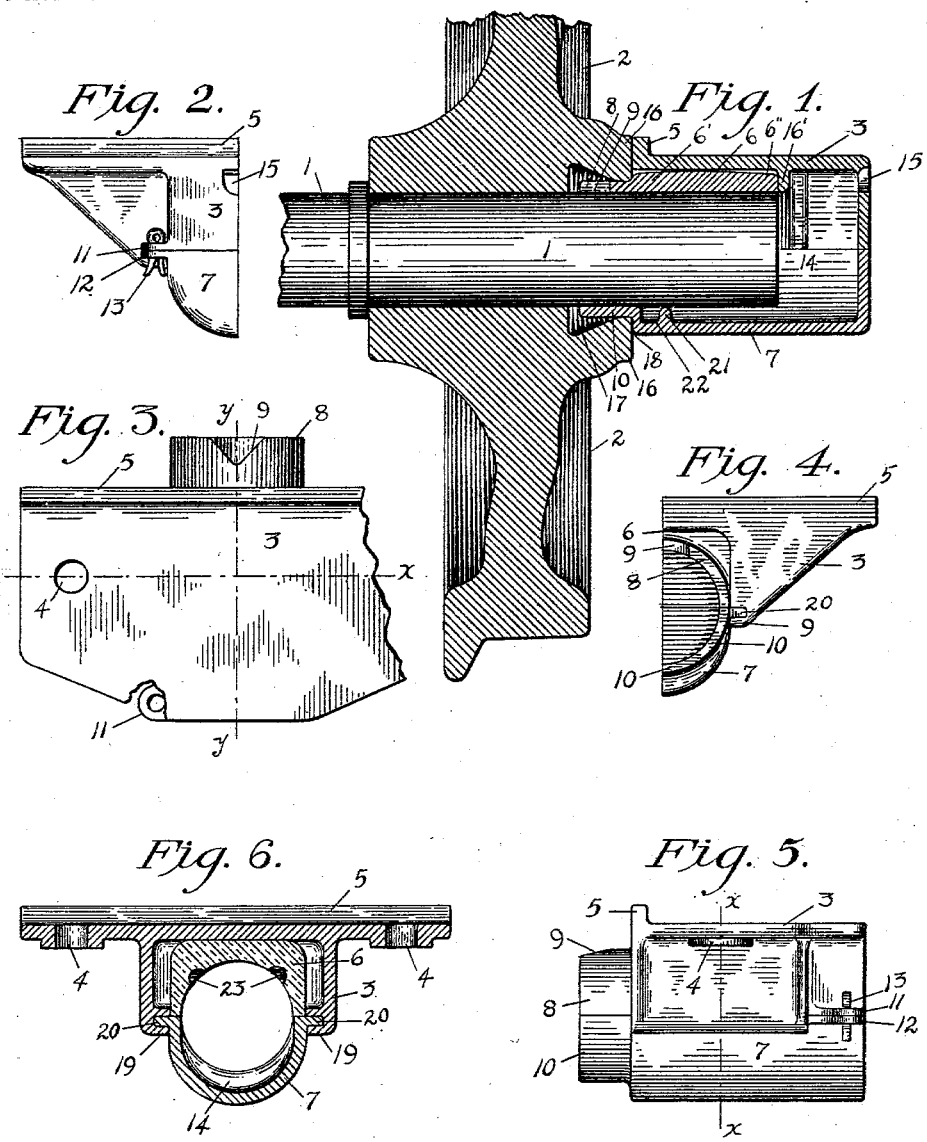

UNITED STATES PATENT OFFICE.

JAMES R. FLEMING, OF SCRANTON, PENNSYLVANIA.

CAR-AXLE LUBRICATOR.

SPECIFICATION forming part of Letters Patent No. 752,897, dated February 23, 1904.

Application filed November 28, 1902. Serial No. 133,096. (No model.)

*To all whom it may concern:*

Be it known that I, JAMES R. FLEMING, a citizen of the United States, residing at Scranton, in the county of Lackawanna and State of Pennsylvania, have invented certain new and useful Improvements in Car-Axle Lubricators, of which the following is a specification.

This invention relates to car-axle boxes or lubricators of the class suitable for mine cars and trucks on which the car-wheel is revoluble on the axle and the axle likewise revoluble in the car-axle box.

The objects of the invention are to improve the means of conducting lubricant from the car-axle box into the interior of the revoluble wheel on the axle, to improve the form of the journal-bearings in the box, to render such axle-boxes readily separable and removable, to guard against the intrusion of grit, to render such lubricators more efficient in general, and other objects as are herein specified, and pointed out in the claims.

To these ends the invention consists of the construction, arrangement, and combination of parts as herein specified, and illustrated in the drawings, in which—

Figure 1 is a view of the end of a mine-car axle with a wheel and car-axle box according to my invention shown in cross-section in their proper relations with the said axle, the cross-section of the box being taken on the line $y\ y$ of Fig. 3. Fig. 2 is an outer end view of one-half of the car-axle box used in my device. Fig. 3 is a top view of the car-axle box with parts broken away. Fig. 4 is an inner end view of half the car-axle box made according to my invention. Fig. 5 is a side elevation of a box with the axle and wheel removed. Fig. 6 is a view of the axle-box in cross-section cut on the line $x\ x$ of Figs. 3 and 5.

Similar characters of reference denote like and corresponding parts throughout the several views.

Referring to the drawings, 1 denotes a mine-car axle on which the wheel 2 is revoluble, the outer end of said axle also being designed to revolve in the bearing 6, contained in the axle-box bracket 3, which bracket is designed to be secured to the sill-timbers of cars and to be secured thereto by means of bolts or other fastenings passed through the holes 4 4. A projection 5 on the said bracket is designed to rest against one corner of the timber and also to provide a shoulder against which the flange 16 of the wheel 2 may slide. An upper journal-bearing-block member 6 is constructed on its under side to conform to the axle, but is reduced thinner at each end, as at 6' 6'', whereby a slightly-rocking motion of the member 3 is permitted. The said member 6 is preferably constructed from hard metal, so as to resist the wear of the axle. A lubricant-receptacle member 7 is arranged on the under side of the end of the axle opposite the bearing-block 6 and is provided with a flange extension 10, designed, with the similar flange extension 8 from the member 6, to extend into the enlarged interior 17 of the wheel 2. The said member 7 is preferably constructed from tough metal suitable for withstanding jars and heavy knocks. A shoulder 18 on the member 7 is arranged to have sliding contact with the shoulder 16 of the wheel 2. The member 7 is designed to be held in position with the bracket 3 by means of a pin 13 passing through bore-holes in the lugs 11 and 12, respectively, of the pieces aforesaid. The outer end of the bearing-block 6 abuts against a flange or projection 16', integrally constructed with the bracket 3. A V-shaped section of the flange 8 is cut out of that part of the flange exposed directly upward when the member is in position. When the members 3 and 7 are placed in position, as stated, their hollowed outer ends registering form an oil-chamber 14, access to which may be had through the bore 15 in the bracket 3. The bracket 3 is also provided with lips or projections 19 19, which form sliding ways for the flanges 20 20 of the member 7. On the bottom of the member 7 on the interior is a flange or fret 21, partitioning off a recess 22 between said fret and the flange 10 of said member. Recesses 23 23 are also arranged in the journal-bearing block 6, said recesses being adapted to be filled with graphite or other suitable lubricating material.

The operation of the device is now readily explained. The chamber 14 may be filled or partially filled with cotton-waste or other lubricant absorbent, which may rest against the outer end of the axle 1. This absorbent, however, is not strictly necessary, and whether used or not the oil or lubricant to be used gathering in the lower part of the member 7 under the axle 1 is conveyed into and fills the recess 22, whence it is conducted between the flange 10 and the axle into the interior cavity 17 of the wheel 1. The cavity 17 is an annular recess having its walls converging outward, so that the outer rim of the flange 16 is in sliding contact with the flanges 8 and 10 of the journal-bearing and lubricant-receptacle, respectively. As the lubricant collects in the annular cavity 17 it is during the revolution of the wheel carried upward, the force of gravity and adhesion on the inner surface causing it to flow outward, so that when directly over the notch 9 it is wiped off, so to speak, and drops downward onto the top of the axle. The weight of the car and axle compressing the axle against the lower side of the bore in the wheel a slight space between the side of the bore and top of the axle serves to introduce the lubricant to that part of the axle in the unenlarged bore of the wheel. The sloping or converging sides of the annular space 17 furnish a sufficient receptacle to hold a considerable quantity of oil in that part of the recess which is lowermost when the wheel is standing still, so that when the wheel is set in motion the oil contained in that part of the recess is carried upward and distributed to the axle, as just described. This arrangement is designed to save the waste or drippings which ordinarily drop out of lubricators of car-wheels of this kind as they heretofore have been constructed. In car-axle boxes of this kind it should be understood one of the things to be avoided is too great rigidity, because the car in which the device is to be used is designed to be run on tracks with various undulations and curves. When a lubricator is constructed as shown, the car-wheel may be constrained in either direction by the rail on which the wheel is run, and the bracket 3 may be rocked over the journal-bearing 6 so as to be brought into contact with it at 6' or 6". Such motion has a tendency to cramp the wheel on the flange extending to the interior thereof; but when the flange is separated into two parts, as 8 and 10 shown, the upper and lower half may slide one upon the other, so as to accommodate themselves to the different positions which the bracket 3 may take in respect to the axle. The pin 13, connecting the two parts, is left slightly loose to permit the motion just stated.

Having thus described my invention and the operation thereof, I do not wish to be confined to the exact details set forth, as many of them may be varied without departing from the general spirit of the invention.

What I do claim, and desire to secure by Letters Patent, is—

1. The herein-described car-axle lubricator comprising in combination with a car-wheel and car-axle, a bracket, a journal-bearing block within said bracket, there being an annular recess within the bore of the car-wheel aforesaid, and a flange on said journal-bearing extending within said annular recess, a lubricant-holding member attachable to said bracket on its under side, and a flange on the said member corresponding to the flange on the journal-bearing aforesaid, and extending with it into the annular recess aforesaid within the wheel, substantially as specified.

2. In a car-axle lubricator, the combination with a car-wheel revolubly mounted on an axle, the said car-wheel having part of its bore enlarged into an annular recess, the walls of said annular recess converging outward, members of the car-axle box having flanges extending within said annular recess, one of said flanges notched at its uppermost part for the purpose of collecting and distributing the lubricant from the walls of the annular recess aforesaid, substantially as specified.

In testimony whereof I affix my signature in presence of two witnesses.

JAMES R. FLEMING.

Witnesses:
JOHN. KURTZ,
JOHN S. STETTER.